(12) United States Patent
Kelekar et al.

(10) Patent No.: US 8,220,502 B1
(45) Date of Patent: Jul. 17, 2012

(54) MEASURING VOLUME OF A LIQUID DISPENSED INTO A VESSEL

(75) Inventors: Rajesh Kelekar, Los Altos, CA (US); Gaurav Verma, Sunnyvale, CA (US); Kurt Weiner, San Jose, CA (US)

(73) Assignee: Intermolecular, Inc., San Jose, CA (US)

( * ) Notice: Subject to any disclaimer, the term of this patent is extended or adjusted under 35 U.S.C. 154(b) by 1210 days.

(21) Appl. No.: 11/966,654

(22) Filed: Dec. 28, 2007

(51) Int. Cl.
*G01F 22/02* (2006.01)

(52) U.S. Cl. .................. 141/5; 141/95; 222/71; 702/55

(58) Field of Classification Search .................. 141/1, 4, 141/5, 94, 95; 222/71; 702/50, 55
See application file for complete search history.

(56) References Cited

U.S. PATENT DOCUMENTS

| | | | |
|---|---|---|---|
| 3,692,048 A | 9/1972 | Uchida et al. | |
| 5,568,882 A * | 10/1996 | Takacs | 222/61 |
| 6,038,919 A * | 3/2000 | Schmitt et al. | 73/149 |
| 6,484,565 B2 | 11/2002 | Shin et al. | |
| 6,499,515 B2 * | 12/2002 | Sander | 141/59 |
| 6,521,187 B1 * | 2/2003 | Papen | 422/504 |
| 6,997,053 B2 | 2/2006 | Forshey et al. | |
| 7,007,822 B2 | 3/2006 | Forshey et al. | |
| 7,878,765 B2 * | 2/2011 | Gonnella et al. | 417/44.2 |
| 7,902,063 B2 * | 3/2011 | Chiang et al. | 438/627 |
| 7,960,313 B2 * | 6/2011 | Fresco et al. | 506/40 |
| 8,011,317 B2 * | 9/2011 | Weiner et al. | 118/407 |
| 2007/0089857 A1 | 4/2007 | Chiang et al. | |
| 2008/0156769 A1 | 7/2008 | Weiner et al. | |

FOREIGN PATENT DOCUMENTS

WO 2006096646 A2 9/2006

* cited by examiner

*Primary Examiner* — Gregory Huson
*Assistant Examiner* — Nicolas A Arnett (57) ABSTRACT

A pressure gauge may be coupled to a vessel into which a liquid chemical is to be dispensed. The volume of the vessel may be known and a control device may determine an initial pressure of the vessel using the pressure gauge. A volume of liquid chemical may be dispensed into the vessel which may cause the pressure within the vessel to increase to a second pressure. The control device may determine the second pressure using the pressure gauge may calculate the volume of liquid chemical dispensed into the vessel using the volume of the vessel, the initial pressure of the vessel, and the second pressure of the vessel.

7 Claims, 8 Drawing Sheets

MEASURING VOLUME OF A LIQUID DISPENSED INTO A VESSEL

GOVERNMENT RIGHTS IN THIS INVENTION

This invention was made with U.S. government support under contract number H94003-07-C-0712. The U.S. government has certain rights in this invention.

BACKGROUND

1. Field of the Invention

Implementations of various technologies described herein generally relate to substrate processing.

2. Description of the Related Art

The following descriptions and examples do not constitute an admission as prior art by virtue of their inclusion within this section.

To achieve the desired performance enhancement for each successive generation of silicon integrated circuits (ICs), semiconductor manufacturing has become increasingly reliant on new materials and their integration into advanced process sequences. Unfortunately, typical semiconductor manufacturing equipment is not well suited for materials exploration and integration. Issues impacting the use of typical semiconductor manufacturing equipment include difficulty in changing process materials and chemicals rapidly, limited ability to integrate and sequence multiple materials or chemicals in a single reactor or process chamber, high equipment cost, large sample size (300 mm wafer) and inflexible process/reactor configurations. To complement traditional manufacturing tools, a need has arisen for process equipment that facilitates fast testing of new materials and materials processing sequences over a wide range of process conditions.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The following paragraphs generally describe one or more implementations of various technologies and techniques directed to measuring a volume of liquid dispensed into a vessel. In one implementation, the vessel into which the liquid is to be dispensed may have a constant volume. Furthermore, the vessel may contain a gas at an initial pressure as measured by a pressure gauge or pressure transducer coupled to the vessel. As a volume of liquid is dispensed into the vessel, the gas may be compressed, thereby increasing the pressure within the vessel. The volume of liquid dispensed into the vessel may be calculated using the volume of the vessel, the initial pressure of the gas within the vessel, and the final pressure of the gas within the vessel. This calculation allows dispensing of liquids into multiple vessels to occur in parallel, thereby increasing throughput of combinatorial processing tools.

One or more implementations of various techniques for measuring a volume of liquid dispensed into a vessel will now be described in more detail with reference to FIGS. 1A-5C in the following paragraphs.

The discussion below is directed to certain specific implementations. It is to be understood that the discussion below is only for the purpose of enabling a person with ordinary skill in the art to make and use any subject matter defined now or later by the patent "claims" found in any issued patent herein.

Combinatorial processing may include any processing, including semiconductor processing, which varies the processing conditions across one or more substrates. As used herein, a substrate may be, for example, a semiconductor wafer, a portion of a semiconductor wafer, solar photovoltaic circuitry, or other semiconductor substrate. The term "substrate" includes a coupon, which is a diced portion of a wafer, or any other device on which semiconductor processes are performed. The coupon or substrate may optionally contain one die, multiple dice (connected or not through the scribe), or portion of die with useable test structures. In some implementations, multiple coupons, or die can be diced from a single wafer and processed combinatorially.

Combinatorial processing is performed by varying processing conditions across multiple substrates, multiple regions of a single substrate, or a combination of the two. Processing conditions may include, for example, chemical formulation, fluid flow rates, temperatures, reaction times, concentrations, agitation or stirring, and the like. For example, a first region of a substrate may be processed using a first process condition (e.g., applying a chemical at a first temperature) and a second region of the substrate may be processed using a second process condition (e.g., applying the chemical at a second temperature). The results (e.g., the measured characteristics of the processed regions) are evaluated, and none, one, or both of the process conditions may be selected as suitable candidates for larger scale processing (e.g., further combinatorial processing or deposition on a full wafer). Techniques for combinatorial processing are described in U.S. patent application Ser. No. 11/352,077, entitled "Methods For Discretized Processing and Process Sequence Integration of Regions of a Substrate," which is incorporated herein by reference.

Several combinatorial processing tools can be used. One type of tool may include a reactor block that has several openings (e.g., cylindrical openings) that define individual reactors on a single substrate. Each of the openings may further include a sleeve that creates a seal with the substrate to contain processing fluids or chemicals within a single reactor. For example, a reactor block may include 28 openings that define 28 regions on a substrate. Each of the 28 regions can be processed using varying process conditions, or multiple regions can have the same processing conditions. For example, seven sets of processing conditions can be performed across four regions each. Each region can then be characterized using various techniques (e.g., electrical test, microscopy), and useful or beneficial techniques and/or conditions can be selected.

Other combinatorial processing may be performed in a manner that is not site isolated. For example, a wafer can be divided into many small coupons, each of which can be processed using different conditions. Using another example, a wafer can be processed using a gradient approach, where the processing varies over the substrate.

Figure 1A:
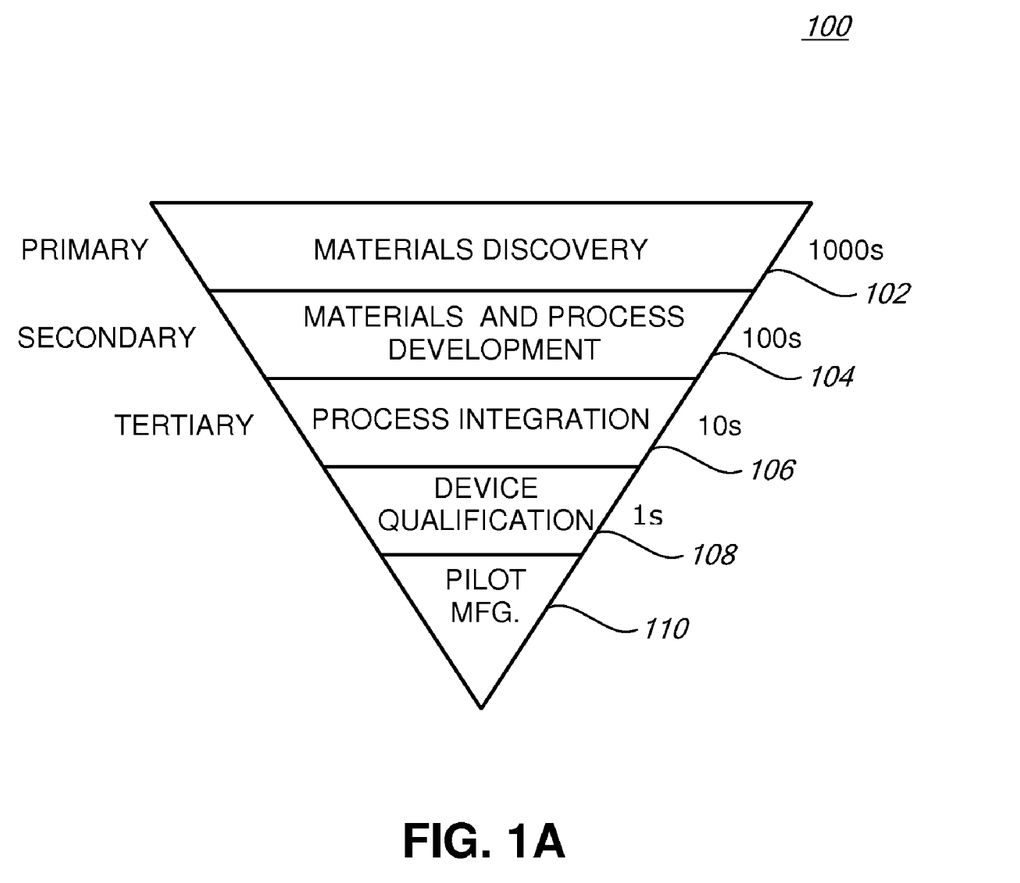
FIG. 1A illustrates a schematic diagram for implementing combinatorial processing in connection with implementations of various technologies described herein.

FIG. 1A illustrates a schematic diagram 100 for implementing combinatorial processing in connection with implementations of one or more technologies described herein. The schematic diagram 100 illustrates that the relative number of combinatorial processes that run with a group of substrates decreases as certain materials and/or processes are selected. Generally, combinatorial processing includes performing a large number of processes during a first screen, selecting promising candidates from those processes, performing the selected processing during a second screen, selecting promising candidates from the second screen, and so on. In addition, feedback from later stages to earlier stages can be used to refine the success criteria and provide better screening results.

For example, thousands of materials are evaluated during a materials discovery stage 102. Materials discovery stage 102 is also known as a primary screening stage performed using primary screening techniques. Primary screening techniques may include dividing wafers into coupons and depositing materials using varied processes. The materials are then evaluated, and promising candidates are advanced to the secondary screen, i.e., materials and process development stage 104. Evaluation of the materials may be performed using metrology tools such as electronic testers and imaging tools, e.g., microscopes.

The materials and process development stage 104 may evaluate hundreds of materials (i.e., a magnitude smaller than the primary stage) and may focus on the processes used to deposit or develop those materials. Promising materials and processes are again selected, and advanced to the tertiary screen or process integration stage 106, where tens of materials and/or processes and combinations are evaluated. The tertiary screen or process integration stage 106 may focus on integrating the selected processes and materials with other processes and materials.

The most promising materials and processes from the tertiary screen are advanced to device qualification stage 108. In device qualification, the materials and processes selected are evaluated for high volume manufacturing, which normally is conducted on full wafers within production tools, but need not be conducted in such a manner. The results are evaluated to determine the efficacy of the selected materials and processes. If successful, the use of the screened materials and processes can proceed to the manufacturing stage 110.

The schematic diagram 100 is an example of various techniques that may be used to evaluate and select materials and processes for the development of semiconductor devices. The descriptions of primary, secondary, etc. screening and the various stages 102-110 are arbitrary and the stages may overlap, occur out of sequence, be described and be performed in many other ways.

Figure 1B:
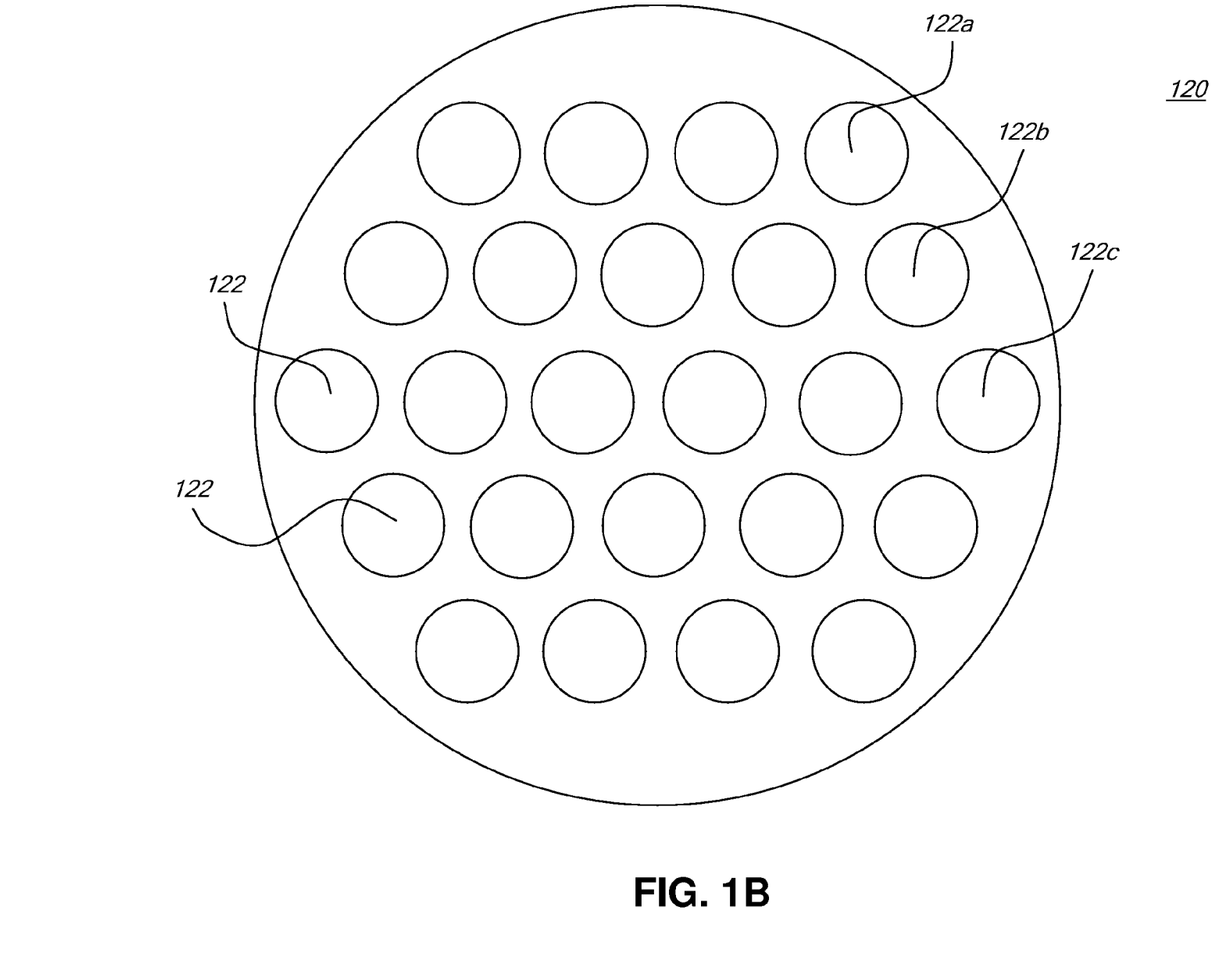
FIG. 1B illustrates an exemplary substrate containing multiple regions for combinatorial processing according to implementations of various technologies described herein.

FIG. 1B illustrates a substrate 120 including multiple regions for combinatorial processing. A substrate 120 includes several regions 122 on which semiconductor processes can be performed. For example, the regions 122a, 122b, and 122c may each have an electroless layer deposited on them. The region 122a may use a first chemical formulation, the region 122b a second chemical formulation, and the region 122c a third chemical formulation. The resulting layers can be compared to determine the relative efficacy of each of the formulations. None, one, or more of the formulations can then be selected to use with further combinatorial processing or larger scale processing (e.g., manufacturing). Any process variable (e.g., time, composition, temperature) can be varied using combinatorial processing.

As discussed above, each of the regions 122 may or may not be site isolated. Site isolation refers to a condition where the regions 122 can be processed individually and independently without interference from neighboring regions. For example, one or more of the regions 122 may include a sleeve having an end that forms a fluid seal with the substrate 120. The sleeve is configured to contain processing fluids (e.g., chemicals), and is made from a material (e.g. polytetrafluoroethylene (PTFE)) that does not react with the processing chemicals used. The chemicals do not leak out of the region into which they were dispensed, and each region 122 can be processed and evaluated individually.

Figure 2:
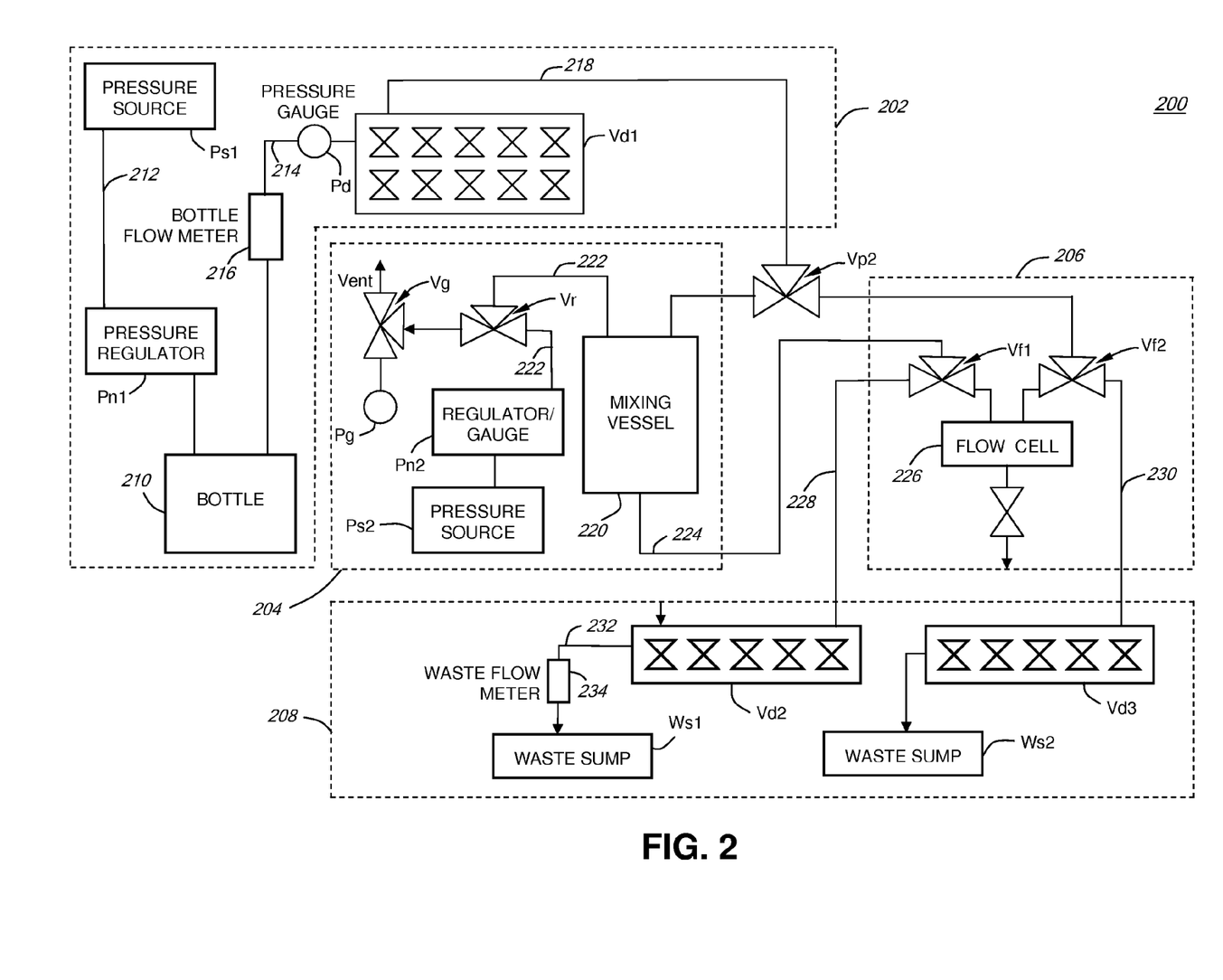
FIG. 2 illustrates a schematic diagram of a combinatorial processing tool according to implementations of various technologies described herein.

Each of the regions 122 may be processed using a cell of a combinatorial processing tool, as described in FIG. 2. The tool is calibrated so that processing in each of the regions 122 is consistent and comparable. Using the technologies described herein to measure the volume of liquids dispensed into a container, more precise control over chemical mixtures and the volume of fluid dispensed into portions of a combinatorial processing tool may be achieved. Flow cells within the combinatorial processing tool may be calibrated such that a consistent application of chemicals across regions of a substrate is achieved. Furthermore, accurate measurement of volumes of liquids dispensed into vessels within the combinatorial processing tool may improve consistency from experiment to experiment, such that the results of one experiment will mirror those of a subsequent experiment, and will be comparable.

Combinatorial Processing Tool

FIG. 2 illustrates a schematic diagram of a combinatorial processing tool 200 according to implementations of one or more technologies described herein. The combinatorial processing tool 200 illustrated in FIG. 2 may be a wet processing tool and may be a portion of a larger combinatorial processing tool. Portions of the combinatorial processing tool 200 may be replicated several times within a larger combinatorial processing tool such that a larger number of variations in substrate processing conditions may be achieved.

The combinatorial processing tool 200 illustrated in FIG. 2 may be divided into four parts. A chemical supply portion 202 may supply chemicals to a chemical mixing portion 204 and a reactor portion 206. The chemical mixing portion 204 may be used for mixing various chemicals, e.g., liquid chemicals, into solutions which may be applied to various locations on a substrate in the reactor portion 206. The reactor portion 206 may contain a site isolated reactor and may apply the solutions to the substrate or portions of the substrate and may subject the substrate or portions thereof to various processing conditions. The reactor portion 206 may be coupled to a waste portion 208 of the combinatorial processing tool 200. The waste portion 208 may be used to capture waste chemicals after substrate processing. A multiple of the portions 202, 204, 206, 208, or their individual components can be included in the combinatorial processing tool. For example, a combinatorial processing tool 200 may include multiple chemical mixing portions 204. Using techniques described herein for measuring amounts of liquids dispensed into the chemical mixing portions 204 allows the liquids to be dispensed in a parallel fashion.

The supply portion 202 of the combinatorial processing tool 200 may include a bottle 210 containing a liquid chemical. The chemical may be applied to the substrate or may be mixed with another chemical to form a solution which is to be applied to the substrate. As illustrated in FIG. 2, a pressure source PS1 and a pressure regulator Pn1 may be coupled to the bottle 210 via a pressure supply line 212. Together the pressure source PS1 and the pressure regulator Pn1 may provide a pressurized gas, such as Nitrogen, at a regulated pressure to the bottle 210 via the supply line 212. In this manner, the pressurized gas may be used to push the liquid chemical out of the bottle 210 and into a line 214 connecting the bottle 210 to a supply manifold Vd1. A flow meter 216 and a pressure transducer Pd may be coupled to the line 214. The flow meter 216 may monitor the flow rate of liquids through the line 214 and the pressure gauge Pd may monitor the pressure within the line 214. The flow rate of fluids in the combinatorial processing tool 200 is measured to ensure desired processing characteristics. For example, in some combinatorial processing operations, chemicals may need to be flowed past a processed region of a substrate at a desired rate. The desired rate can be maintained by monitoring output of the flow meter.

The supply manifold Vd1 may contain a plurality of two-way and/or multi way valves connecting the bottle 210 to a plurality of mixing cells/vessels within the combinatorial processing tool 200. Furthermore, in lieu of a single bottle 210, a plurality of bottles containing various chemicals may be coupled to the supply manifold Vd1 such that the supply manifold Vd1 may supply various chemicals to multiple mixing portions or multiple site isolated reactor portions of the combinatorial processing tool 200. Additionally, in lieu of a single supply manifold Vd1, a plurality of supply manifolds Vd1 may be present in the combinatorial processing tool 200. Together the plurality of bottles, valves, and supply manifolds may enable the supply of various chemicals and chemical mixtures to the mixing portion 204 and the site isolated reactor portion 206 of the combinatorial processing tool 200.

The line 214 coupling the bottle 210 to the supply manifold Vd1 may be coupled to a valve, e.g., a multi-way valve, within the supply manifold Vd1 such that the supply manifold Vd1 may control the flow of chemicals from the bottle 210 to the mixing portion 204 or the reactor portion 206 of the combinatorial processing tool 200.

The output of the valve in the supply manifold Vd1 may be coupled via a line 218 to a valve Vp2. The valve Vp2 may be a multi-way valve which controls the flow of fluids/chemicals from the supply manifold Vd1 into either the mixing portion 204, site-isolated reactor portion 206, or both.

The mixing portion 204 of the combinatorial processing tool 200 is provided to allow thorough solution mixing of chemicals provided by supply portions. In order to form a solution, a plurality of chemicals may flow from the supply portion 202, e.g., the bottle 210, into different mixing vessels in the mixing portion 204. The mixing vessel 220 may then mix the chemicals to form solutions. The mixing portion 204 may also provide accurate temperature and pH control of a solution being mixed in the mixing portion 204.

A pressure source Ps2 and a pressure regulator Pn2 may be coupled to the mixing vessel 220 via a valve Vr and a supply line 222. Together the pressure source PS2 and the pressure regulator Pn2 may provide a pressurized gas, e.g., Nitrogen, at a regulated pressure to the mixing vessel 220 via the valve Vr and the supply line 222. An outlet of the valve Vr may be coupled to another valve Vg to vent pressure within the supply line 222. The pressure in the supply line 222 may be measured by a pressure transducer Pg.

The pressurized gas provided by the pressure source Ps2 and the pressure regulator Pn2 may push the mixed chemicals in the mixing vessel 220 through a line 224 and into the site-isolated reactor portion 206 of the combinatorial processing tool 200. The mixed chemicals may flow through a valve Vf1 and into a flow cell 226. The flow cell 226 may be one portion of a site isolated reactor, and may be used to apply the mixed chemicals to a portion or portions of a substrate under processing in the site-isolated reactor portion 206 of the combinatorial processing tool 200. The flow cell 226 may have a series of parallel cells forming site-isolated reactors which may be configured to effect site-isolated processing on proximate regions on the substrate. Chemicals may also be provided to the flow cell 226 and, consequently, to a substrate via the supply manifold Vd1.

After exposing the substrate to the desired amount of chemicals, excess or waste chemicals may exit the flow cell 226 through valve Vf1 and waste line 228 or through valve Vf2 and waste line 230. Waste line 228 may be coupled to a waste manifold Vd2, and waste line 230 may be coupled to waste manifold Vd3. The waste manifolds may be coupled to waste sumps (e.g., waste sump Ws1 and waste sump Ws2) and the waste manifolds may be used to divert chemicals into specific waste sumps. A waste line 232 may couple a waste manifold Vd2 to a waste sump Ws1. Furthermore, a waste flow meter 234 may be coupled to the waste line 232 to measure a flow rate of waste liquids flowing into the waste sump Ws1.

The flow meters (e.g., flow meter 216 and flow meter 234) may be any type of flow meter available. For example, the flow meters may be ultrasonic flow meters which measure the travel time of ultrasonic waves through a liquid and calculates a flow rate of the liquid based on the measured travel time of the ultrasonic waves. The flow meters may also be magnetic flow meters which measure changes in a magnetic field applied to a liquid to determine a rate of liquid flow.

Measuring Volume of Liquid Dispensed into a Vessel

When processing semiconductor substrates it may be desirable to know how much of a liquid has been dispensed into a vessel. For example, in the combinatorial processing tool 200 illustrated in FIG. 2 it may be desirable to know a volume of a liquid chemical which has been dispensed into a mixing vessel 220 in order to ensure formation of precise solutions in the mixing vessel 220. Using techniques described herein, for example, precise mixing of solutions can improve combinatorial processing by providing consistent application across regions of a substrate, across regions on different substrates, and across different experiments. These techniques improve the results of combinatorial processing and additionally can help to maintain the calibration of flow cells used in combinatorial processing tools.

Determining a volume of liquid which has been dispensed into a vessel may be accomplished using a flow meter. A flow meter may measure the rate at which a liquid is flowing through the flow meter. If the flow meter is coupled to a line through which a liquid flows into the vessel, the volume of liquid dispensed into the vessel may be calculated using the flow rate measured by the flow meter and the amount of time the liquid has been flowing into the vessel.

This technique of measuring the amount of liquid dispensed into the vessel in one implementation may use flow meters coupled to each vessel into which the volume of liquid is to be dispensed and measured. Thus, a large number of flow meters may be necessary in a combinatorial processing tool with multiple mixing vessels. The large number of flow meters may add to the cost of producing a combinatorial processing tool.

Figure 3:
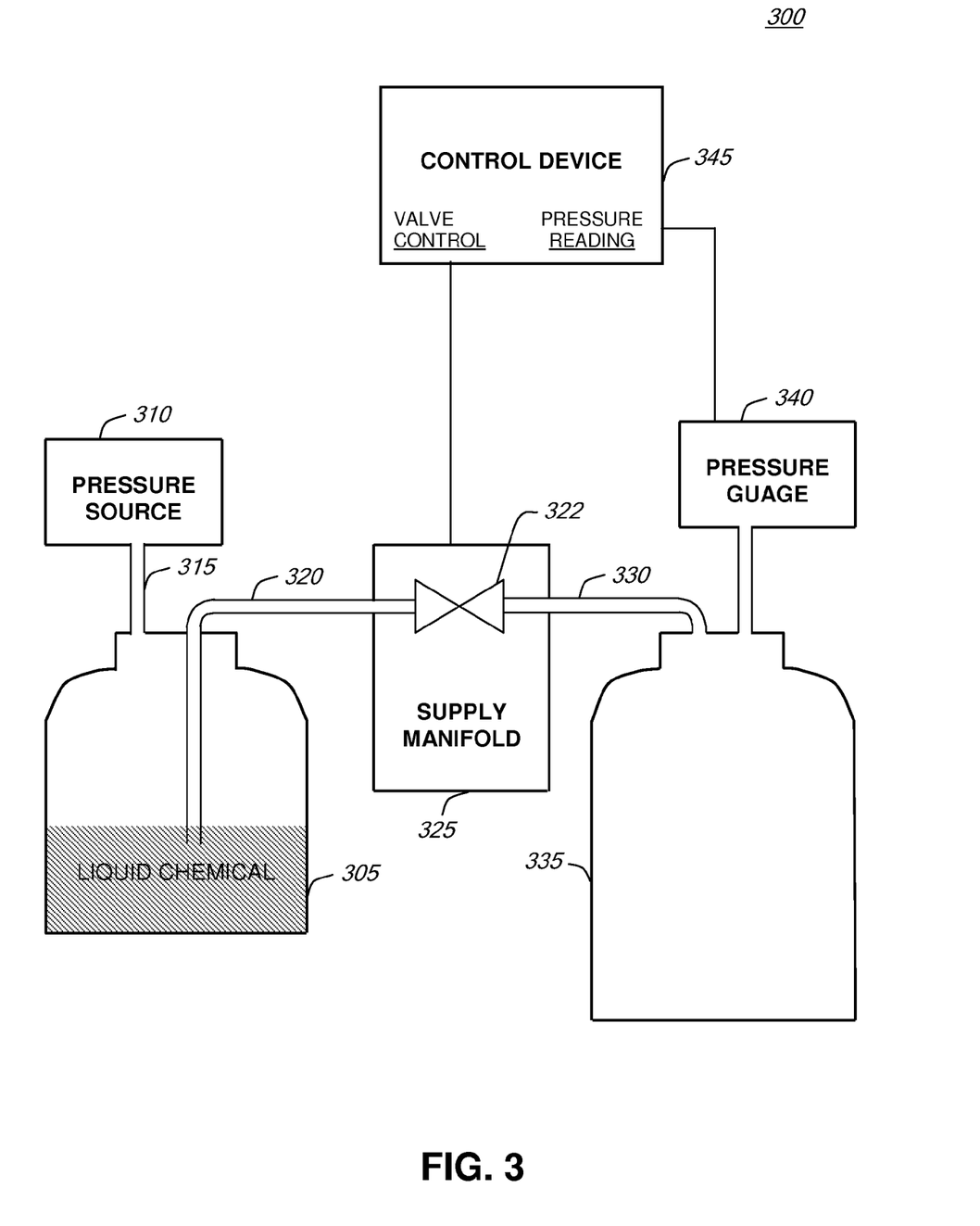
FIG. 3 illustrates a system for measuring a volume of liquid dispensed into a vessel according to implementations of various technologies described herein.

FIG. 3 illustrates a system 300 which may be used to measure a volume of liquids dispensed into a vessel in accordance with various technologies described herein. The system 300 may be a portion of the combinatorial processing tool 200 illustrated in FIG. 2, for example incorporated into the chemical mixing portion 204. Additionally, the system 300 can be used with any system to measure flow rates or volumes of liquid dispensed. The system 300 includes a bottle 305 containing a liquid chemical. A pressurized gas may be provided to the bottle from a pressure source 310 via a supply line 315 which is coupled to the bottle 305. A liquid chemical supply line 320 may also be coupled to the bottle 305, and a first end of the supply line 320 may be located within the bottle 305 such that the first end of the liquid chemical supply line 320 is immersed in the liquid chemical. The bottle 305 may be pressurized by the pressure source 310 such that the liquid chemical may be pushed out of the bottle through the supply line 320 when a downstream valve 322 coupled to the supply line 320 is opened.

A second end of the supply line 320 may be coupled to an inlet of the valve 322 which is located within a supply manifold 325. The supply manifold 325 may contain a plurality of multiple-way valves for routing liquid chemicals into mixing vessels and/or reactors within a combinatorial processing tool. An outlet of the valve 322 to which the supply line 320 is coupled may be coupled to a first end of a second supply line 330. The second end of the second supply line 330 may be coupled to a mixing vessel 335. The mixing vessel 335 may be the destination vessel into which the liquid chemical in the bottle 305 is to be dispensed. The mixing vessel 335 may have a constant volume V0. Furthermore, the mixing vessel 335 may contain a gas having an initial pressure P0 and may be able to maintain an isothermal state (constant temperature). With the exception of the second supply line 330 coupled to the mixing vessel 335, the mixing vessel 335 may be sealed while liquid chemical is dispensed into the vessel. In one embodiment, liquid may be dispensed into the mixing vessel 335 and other mixing vessels 335 using the volume measuring techniques described herein. For example, with calibrated mixing vessels (i.e., when the empty volume of the vessel is known), a combinatorial processing tool can dispense liquid from a bottle and into multiple mixing vessels in parallel, since these techniques allow computation of the volume of liquid dispensed into each mixing vessel. Some other techniques for measuring the amount of liquid dispensed can only be used with serial dispensing of liquid into multiple mixing vessels.

A pressure gauge 340 or pressure transducer may be coupled to the mixing vessel 335 and may be configured to measure a pressure (e.g., gas pressure) within the mixing vessel 335. The pressure gauge 340 may also be coupled to a controller or a control device 345 such that the pressure gauge 340 provides the measured pressure within the mixing vessel 335 to the control device 345.

The control device 345 may be, for example, a computer system containing one or more processors, application specific integrated circuits (ASICs), systems on a chip (SOCs), programmable logic, memory (e.g., hard disk drive(s), random access memory, etc.), devices for receiving input from a user (e.g., keyboard, mouse, etc.), communication devices (e.g., network controllers, serial ports, etc.), and/or devices for outputting data (e.g., printers, monitors, data storage, etc.).

The control device 345 may be configured to receive as input a recipe for processing a substrate or substrates within the combinatorial processing tool 200. The control device 345 may also be configured to control the operation of the combinatorial processing tool 200 such that the substrate or substrates are processed in a manner specified by the recipe. For example, a recipe may specify how much of a liquid chemical is to be dispensed into the mixing vessel 335 from the bottle 305. Consequently, the control device 345 may be coupled to the supply manifold 325 and may be configured to place the valve 322 in the supply manifold 325 in a first or an open position to allow liquid chemicals to flow into the mixing vessel 335. Furthermore, as described further below with respect to FIG. 4, the control device 345 may be configured to calculate the amount of liquid dispensed into the mixing vessel 335, and configured to place the valve 322 in a second or closed position, thereby stopping the flow of liquid into the mixing vessel 335 when the amount of liquid specified by the recipe has been dispensed into the mixing vessel 335.

Figure 4:
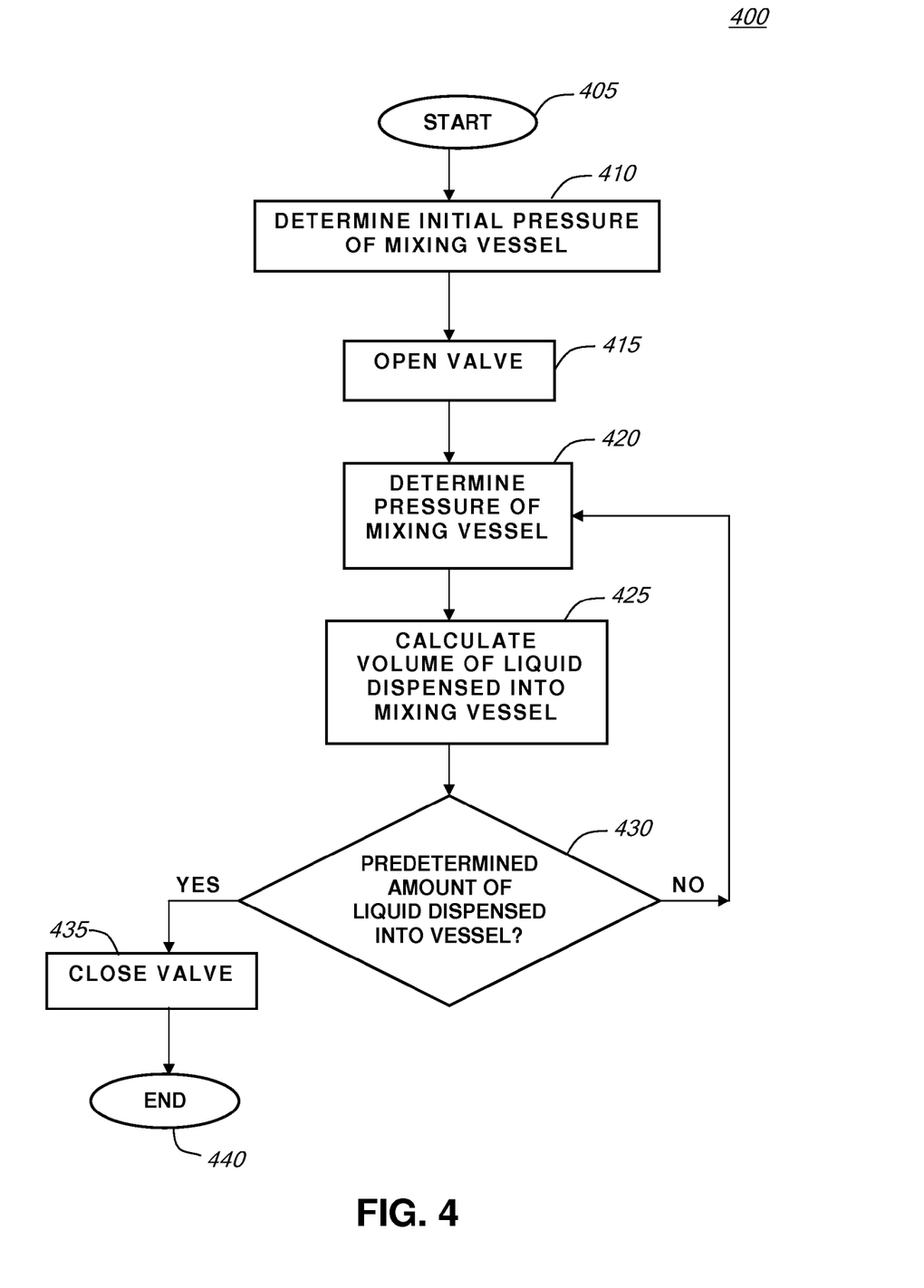
FIG. 4 is a flow diagram illustrating a method for measuring a volume of liquid dispensed into a vessel according to implementations of various techniques described herein.

FIG. 4 illustrates a method 400 for measuring the volume of liquid dispensed into the mixing vessel 335 using the system 300 illustrated in FIG. 3 in accordance with implementations of various techniques described herein.

In one implementation, the method 400 may begin at step 405 when the control device 345 determines that a liquid chemical is to be dispensed into the mixing vessel 335. At step 410, the control device 345 may determine an initial pressure of the gas within the mixing vessel 335. The initial pressure within the mixing vessel 335 may be determined by checking the pressure measurement provided to the control device 345 by the pressure gauge 340. The initial pressure within the mixing vessel 335 may be determined before the liquid chemical has been dispensed into the mixing vessel 335.

Figure 5A:
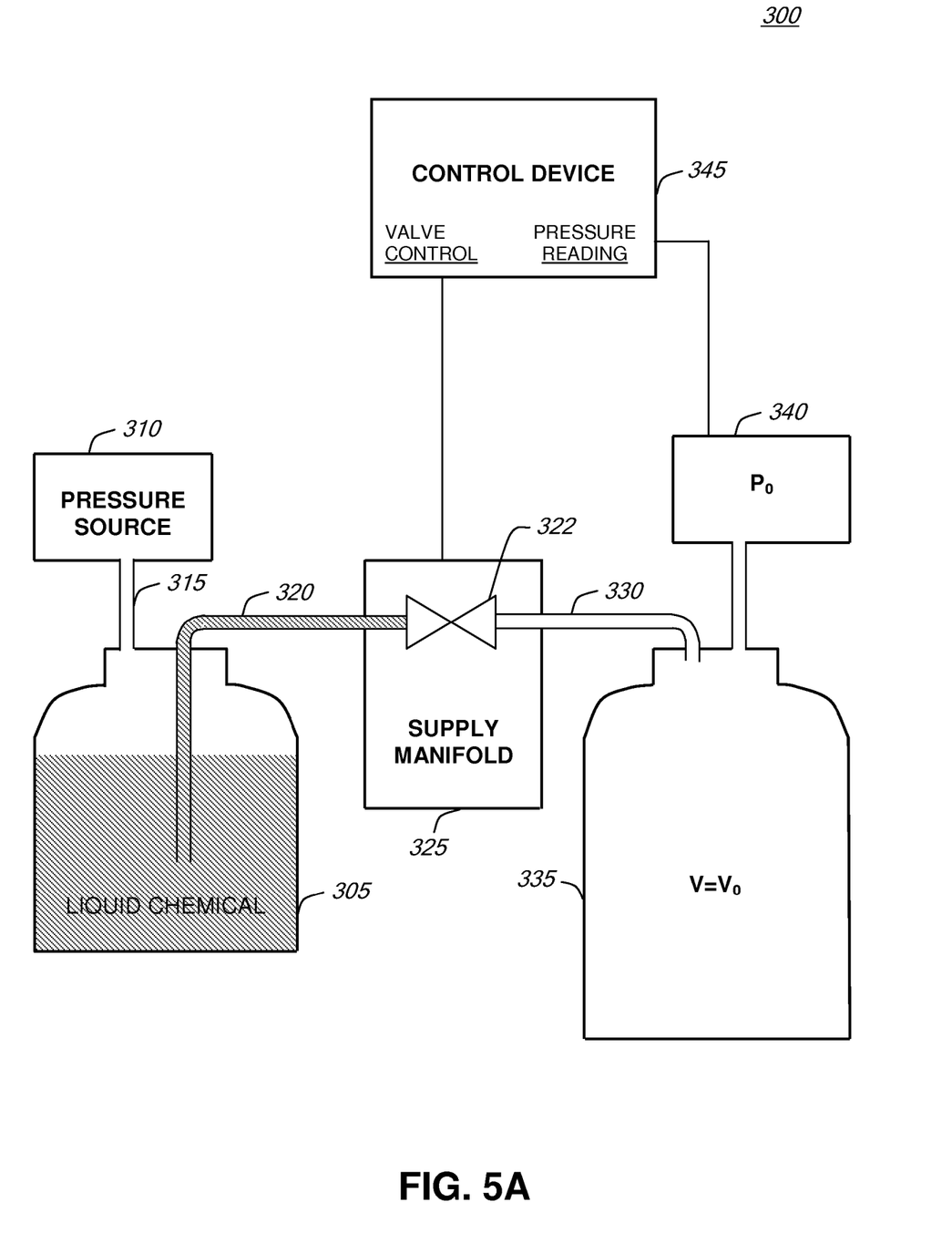
FIGS. 5A-5C illustrate liquid being dispensed into a vessel according to implementations of various technologies described herein.

For example, FIG. 5A illustrates the system 300 before the liquid chemical has been dispensed into the mixing vessel 335. As illustrated in FIG. 5, the mixing vessel 335 may have an initial pressure of P0 as measured by the pressure gauge 340 coupled to the mixing vessel 335. Furthermore, the mixing vessel 335 may have a constant volume of V0.

Referring back to method 400, after the initial pressure within the mixing vessel 335 has been determined, at step 415 the control device 345 may move the valve 322 in the supply manifold 325 to a first or an open position, which may allow the pressurized gas in the bottle 305 to push the liquid chemical in the bottle 305 through the line 320, through the supply manifold 325, through the line 330 and into the mixing vessel 335. As the liquid chemical flows into the mixing vessel 335, it may compress the gas within the mixing vessel 335, thereby increasing the pressure of the gas within the mixing vessel 335. The new or increased pressure in the mixing vessel 335 may be measured by the gauge 340 coupled to the mixing vessel 335.

Figure 5B:
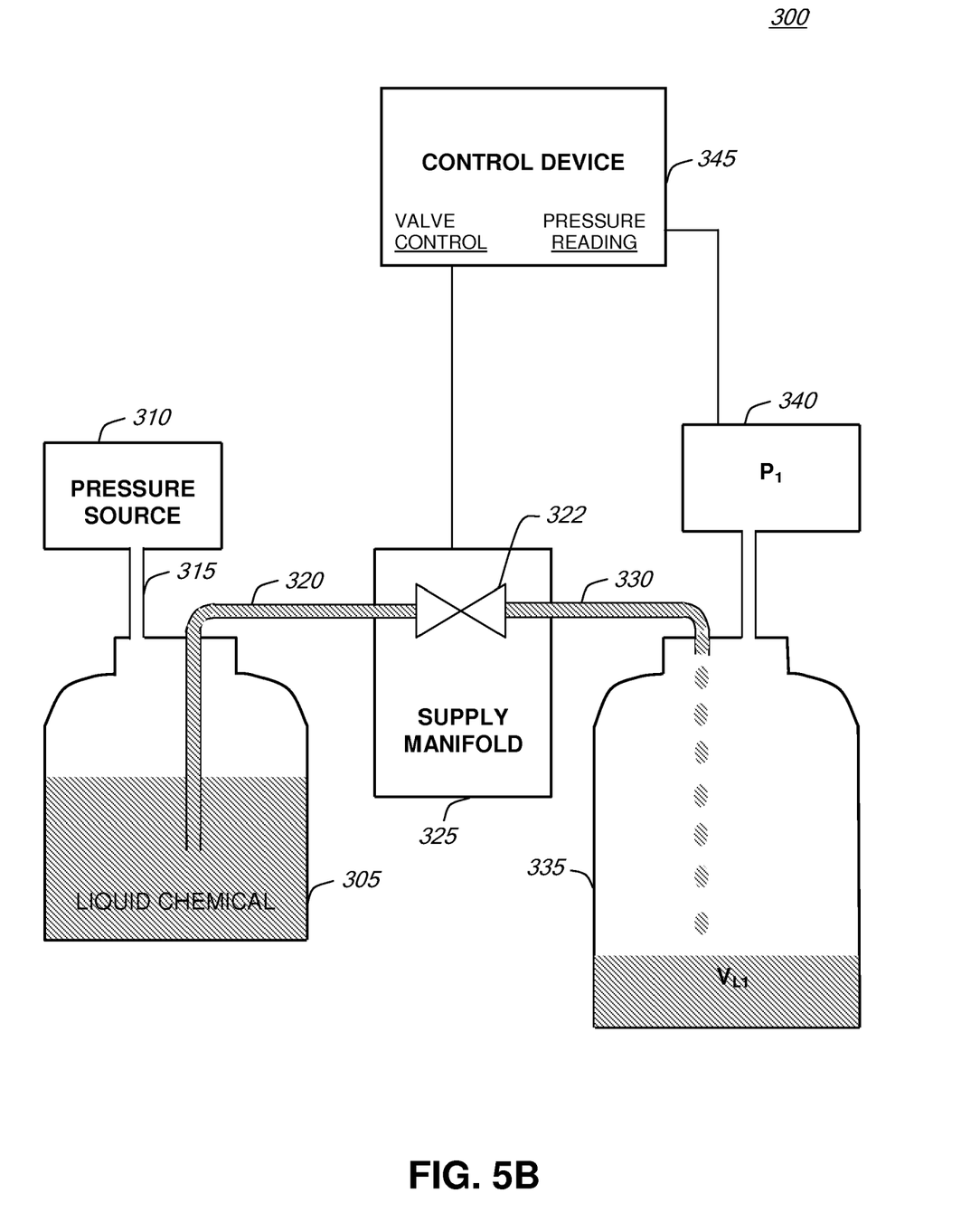

FIG. 5B illustrates the system 300 as the liquid chemical is flowing into the mixing vessel 335. As the liquid chemical flows into the mixing vessel 335, a volume of liquid chemical VL1 may accumulate within the mixing vessel 335. Furthermore, as the liquid chemical flows into the mixing vessel 335, the pressure within the mixing vessel 335 increase as a result of the new liquid displacing and compressing the gas within the vessel 335. The increased or new pressure P1 is measured by the pressure gauge 340 coupled to the mixing vessel 335.

At step 420, the control device 345 may again determine the pressure within the mixing vessel 335. The control device 345 may determine the pressure within the mixing vessel 335 by checking the measured pressure provided to the control device 345 by the pressure gauge 340.

At step 425, the control device 345 may calculate the volume of liquid which has been dispensed into the mixing vessel 335. The control device 345 may calculate the volume of the liquid dispensed into the mixing vessel 335 using the initial pressure within the mixing vessel 335 (i.e., P0 determined during step 410), the volume of the vessel (i.e., V0), and the increased or new pressure within the mixing vessel 335 (i.e., P1 determined during step 420).

If the gas within the mixing vessel 335 is an ideal gas, the control device 345 may calculate the volume of liquid dispensed into the mixing vessel 335 using the following equation:

$$V_L = V_0\left(1 - \frac{P_0}{P}\right).$$ Equation 1

In Equation 1, VL is the volume of liquid within the mixing vessel 335, V0 is the volume of the mixing vessel 335, P0 is the initial pressure of the mixing vessel 335, and P is the measured pressure of the mixing vessel 335 after an amount of liquid chemical has been dispensed into the mixing vessel 335 (e.g., P1 determined during step 420). Since V0, P0, and P are known, the control device 345 may calculate the volume of liquid which has been dispensed into the mixing vessel 335 (VL).

The control device 345 may be configured to dispense a predetermined volume of liquid chemical into the mixing vessel 335. For example, a recipe for substrate processing may specify the volume of liquid chemical to be dispensed into the mixing vessel 335. Consequently, after determining the volume of liquid which has been dispensed into the mixing vessel 335, the control device 345 may proceed to step 430 to determine if a sufficient volume of liquid chemical has been dispensed into the mixing vessel 335. The control device 345 may determine if the predetermined volume of liquid chemical has been dispensed into the mixing vessel 335 by comparing the predetermined volume of liquid with the volume of liquid which has been dispensed into the vessel.

If the volume of liquid dispensed into the mixing vessel 335 is equal to the predetermined amount of liquid, the control device 345 may proceed to step 430 where the control device 345 may move the valve 322 within the supply manifold to a second or closed position such that the flow of liquid chemical from the bottle 305 to the mixing vessel 335 is stopped. Then, the control device 345 may proceed to step 435 where the method 400 may end.

However, if during step 425 the control device 345 determines that the volume of liquid chemical dispensed into the mixing vessel 335 is less than the predetermined amount of liquid chemical, the control device 345 may return to step 420 to again determine the pressure within the mixing vessel 335. By returning to step 420, the control device 345 may allow more liquid chemical to dispense into the mixing vessel 335 and, thus, the volume of liquid chemical in the mixing vessel 335 may approach or reach the predetermined volume of liquid chemical which is to be dispensed into the mixing vessel 335.

Figure 5C:
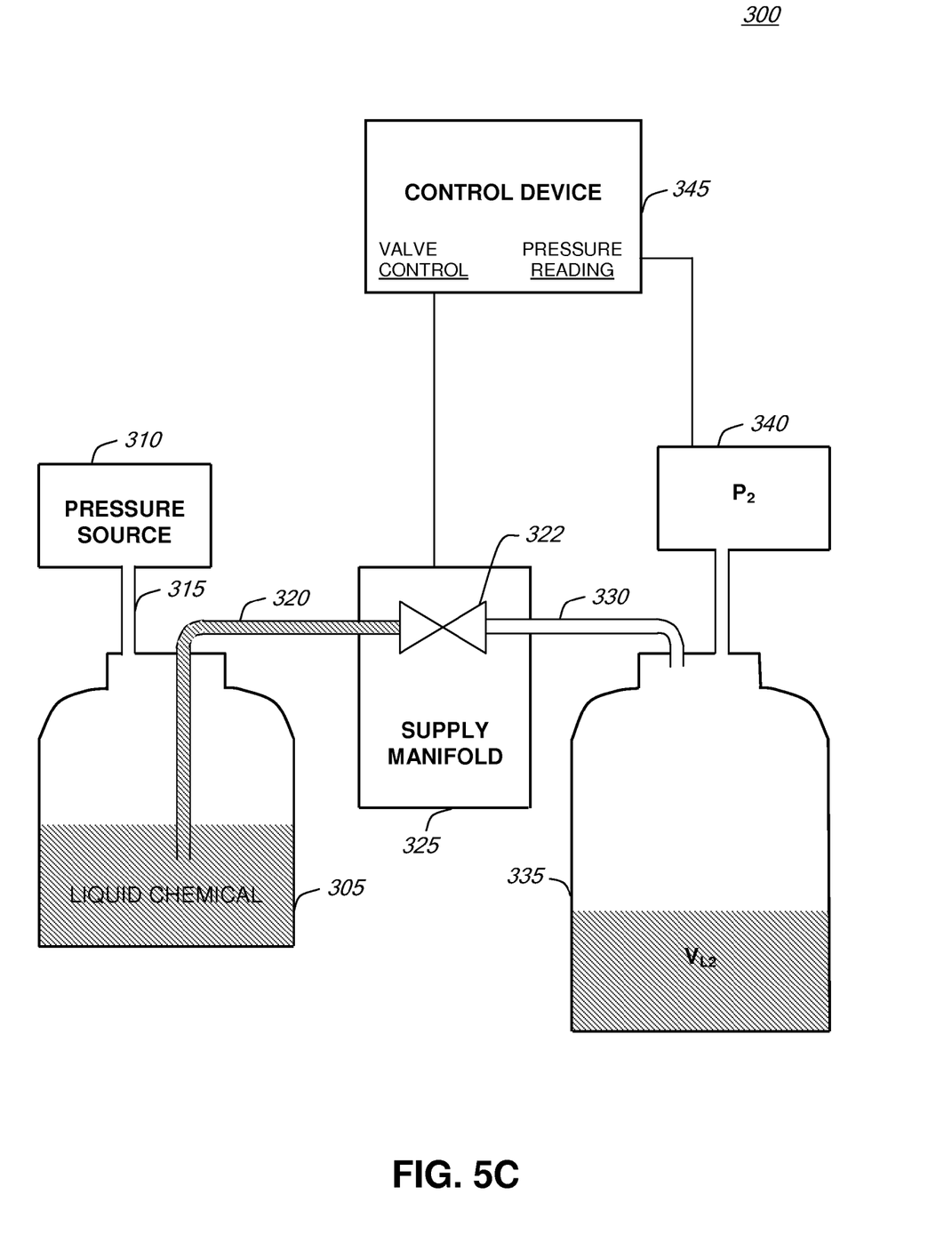

FIG. 5C illustrates the final volume of liquid chemical VL2 dispensed into the mixing vessel 335. The final volume of liquid chemical VL2 may be the predetermined volume of liquid chemical specified by the recipe. FIG. 5C also illustrates how the control device 345 has closed the valve 322 in the supply manifold 325 (i.e., in step 430 of method 400) thereby stopping the flow of the liquid chemical from the bottle 305 to the mixing vessel 335. In FIG. 5C, the final pressure P2 has been measured by the pressure gauge 340 and consequently, the control device 345 may calculate the final volume of liquid VL2 using the initial pressure (i.e., P0), the volume of the mixing vessel 335 (i.e., V0), the final pressure of the mixing vessel (i.e., P2) and Equation 1 which results in the following equation:

$$V_{L2} = V_0\left(1 - \frac{P_0}{P_2}\right).$$ Equation 2

After completing method 400, the control device 345 may flow a second liquid chemical into the mixing vessel 335 and may determine the volume of the second liquid chemical dispensed into the mixing vessel 335 using Equation 1, the volume of the mixing vessel 335 (i.e., V0), the initial pressure of the mixing vessel 335 before the second liquid chemical is flowed into the mixing vessel 335 (e.g., P2), and the pressure of the vessel after some volume of the second liquid chemical has been dispensed into the vessel. The method 400 may be used with the second and subsequent liquid chemicals for mixing and other purposes.

Furthermore, the liquid chemicals which flow into the mixing vessel 335 may be mixed to form a solution. After mixing the liquid chemicals into a solution within the mixing vessel 335, the control device 345 may direct the combinatorial processing tool to flow the solution out of an outlet of the mixing vessel and into a reactor portion 206 of the combinatorial processing tool where the solution may be applied to a portion or portions of a substrate or substrates under processing in the reactor portion 206 of the combinatorial processing tool 200. These techniques therefore can provide more precisely mixed chemical solutions to the reactor portion 206, resulting in more consistent results across regions, substrates, and different experiments. The combinatorial results are therefore more comparable to each other and other combinatorial experiments. Additionally, precise mixing of chemical solutions and application of those solutions to the reactors and flow cells helps maintain calibration of the flow cells.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for measuring a volume of liquid dispensed into a vessel,
comprising:
measuring a first pressure within the vessel, wherein the vessel has a constant volume;
dispensing the liquid into the vessel, wherein the liquid is used in a semiconductor manufacturing process, and wherein the vessel is sealed while the liquid is dispensed into the vessel;
measuring a second pressure within the vessel,
wherein the first pressure corresponds to the pressure within the vessel without the dispensed liquid, and wherein the second pressure corresponds to the pressure within the vessel with the dispensed liquid; and determining the volume of the liquid dispensed into the vessel based on the first pressure within the vessel, the volume of the vessel and the second pressure within the vessel.

2. The method of claim 1, further comprising:

defining multiple regions of a substrate including a plurality of cells to perform combinatorial processing; and dispensing liquid from the vessel to the plurality of cells to perform the combinatorial processing.

3. The method of claim 2, further comprising:

wherein dispensing the liquid into the vessel comprises dispensing the liquid into a plurality of vessels; and dispensing the liquid into the plurality of vessels in a parallel fashion.

4. The method of claim 1 wherein the volume of the liquid dispensed into the vessel is determined using $$V_L = V_0\left(1 - \frac{P_0}{P}\right),$$

wherein $V_L$ represents the volume of the liquid within the vessel, $V_0$ represents the volume of the vessel, $P_0$ represents the first pressure within the vessel, and $P$ represents the second pressure within the vessel.

5. The method of claim 1, wherein dispensing the liquid into the vessel comprises: opening an outlet of a valve disposed between the vessel and a second vessel containing the liquid, thereby allowing the liquid to flow from the second vessel into the vessel.

6. The method of claim 1, wherein the vessel is a mixing vessel for mixing solutions to be applied to a substrate in a combinatorial manner.

7. The method of claim 1, further comprising:

determining if the volume of liquid dispensed into the vessel is equal to a predetermined value; and stopping the dispensing of the liquid into the vessel if the volume of liquid dispensed into the vessel is equal to the predetermined value.

\* \* \* \* \*